(12) United States Patent
Taglang

(10) Patent No.: US 9,186,729 B2
(45) Date of Patent: Nov. 17, 2015

(54) CHUCK

(71) Applicant: Johann Taglang, Medlingen (DE)

(72) Inventor: Johann Taglang, Medlingen (DE)

(73) Assignee: ROEHM GMBH, Sontheim (DE)

( * ) Notice: Subject to any disclaimer, the term of this patent is extended or adjusted under 35 U.S.C. 154(b) by 166 days.

(21) Appl. No.: 13/755,153

(22) Filed: Jan. 31, 2013

(65) Prior Publication Data
US 2013/0193654 A1 Aug. 1, 2013

(30) Foreign Application Priority Data

Feb. 1, 2012 (DE) .......................... 10 2012 100 821

(51) Int. Cl.
B23B 31/02 (2006.01)
B23B 31/36 (2006.01)
B23B 31/16 (2006.01)
B23B 31/28 (2006.01)
B23B 31/177 (2006.01)

(52) U.S. Cl.
CPC ................. *B23B 31/36* (2013.01); *B23B 31/16* (2013.01); *B23B 31/16262* (2013.01); *B23B 31/16291* (2013.01); *B23B 31/28* (2013.01); *B23B 2215/20* (2013.01); *B23B 2270/022* (2013.01); *Y10T 279/21* (2015.01); *Y10T 279/27* (2015.01); *Y10T 279/33* (2015.01)

(58) Field of Classification Search
CPC .................. B23B 31/16262; B23B 31/16291; B23B 31/28; B23B 2215/20; B23B 2270/022; B23B 31/36; Y10T 279/21; Y10T 279/27
USPC ............ 279/126, 134, 141, 133; 82/150, 151, 82/165, 106, 170
See application file for complete search history.

(56) References Cited

U.S. PATENT DOCUMENTS

| 1,424,754 | A | * | 8/1922 | Cullen | ............................ 82/104 |
| 3,076,662 | A | * | 2/1963 | Kostyrka | ...................... 279/4.11 |
| 4,383,457 | A | * | 5/1983 | Corcoran | ........................ 82/1.11 |
| 4,616,538 | A | * | 10/1986 | Hessbruggen | .................. 82/165 |
| 5,025,689 | A | * | 6/1991 | Mayer | .............................. 82/106 |
| 5,230,265 | A | * | 7/1993 | Schmid | ............................. 82/106 |
| 2003/0071526 | A1 | | 4/2003 | Faigle | |
| 2007/0231096 | A1 | * | 10/2007 | Shoji et al. | .................... 409/132 |

FOREIGN PATENT DOCUMENTS

DE 3432293 A1 3/1986
DE 9113879 U 2/1992

* cited by examiner

Primary Examiner — Eric A Gates
Assistant Examiner — Paul M Janeski
(74) Attorney, Agent, or Firm — Andrew Wilford

(57) ABSTRACT

A chuck has a chuck body rotatable about an axis, a plurality of jaws radially displaceable on the body for gripping a workpiece, a chuck drive for rotating the chuck about the axis, and a center point axially shiftable in the body and axially engageable with the workpiece gripped by the jaws. An electric drive is coupled to the center point for axially shifting same.

11 Claims, 4 Drawing Sheets

Fig. 2 - Prior Art

CHUCK

FIELD OF THE INVENTION

The present invention relates to a chuck. More particularly this invention concerns a chuck for gripping an elongated workpiece like a crankshaft for machining of the crankpin and/or journal surfaces of the shaft.

BACKGROUND OF THE INVENTION

A typical chuck has a chuck body rotatable about an axis, a plurality of jaws radially displaceable on the body for gripping a workpiece, a chuck drive for rotating the chuck about the axis, and a center point axially shiftable in the body and axially engageable with the workpiece gripped by the jaws. As described in DE 91 13 879 the jaws are moved by a hydraulically powered piston. A piston chamber can be provided to move the center point in the piston in order to actuate the jaws, thereby creating a space-saving double-acting piston configuration.

When crankshafts are produced, the crankshaft workpieces are face-milled at their end faces. Then a center hole is formed in each end face whose function is to allow precise axial centering of the crankshaft for subsequent radial machining. The crankshaft is typically clamped between two center points—one being fixed and the other being axially moveable. Using a hydraulic arrangement for moving the center point makes it very difficult to meet the requirements for environmentally friendly energy-efficient technologies. With this in mind, it becomes necessary to seek new approaches for its axial actuation.

OBJECTS OF THE INVENTION

It is therefore an object of the present invention to provide an improved chuck.

Another object is the provision of such an improved chuck that overcomes the above-given disadvantages, in particular where the gripping parts function successfully without hydraulic components.

SUMMARY OF THE INVENTION

A chuck has according to the invention a chuck body rotatable about an axis, a plurality of jaws radially displaceable on the body for gripping a workpiece, a chuck drive for rotating the chuck about the axis, and a center point axially shiftable in the body and axially engageable with the workpiece gripped by the jaws. An electric drive is coupled to the center point for axially shifting same.

The advantage of the invention is that the electric motor moves the center point electrically. In contrast to a binary hydraulic approach, this enables the center point to be moved axially precisely, continuously, and with energy efficiency. During manufacture of the crankshaft, the electric motor is operated accordingly so as to center the center point on the end face of the crankshaft, after which the jaws that radially secure the crankshaft can be clamped against it.

It has been found especially advantageous to provide a spindle drive for axial movement. This provides a simple way of converting rotation of the electric motor to straight-line movement of the center point.

A useful approach is to provide the spindle drive between a rod driven by the electric motor and the center point. This rod can be used to obviate the need to connect the electric motor directly to the spindle drive. This allows the distance between the electric motor and the center point to be spanned, with the result that the electric motor can be mounted so as to be physically offset from the parts of the chuck body that rotate when the chuck is in use.

A preferable approach is that a spindle element is provided that is detachably connected to the center point. This spindle moves axially when the electric motor or the rod rotate, thereby at the same time driving the center point. Whenever the associated components are due for replacement after the spindle drive has worn out, this spindle can be replaced without having to swap out the entire center point.

It is furthermore advantageous to provide an elastic element between the spindle and the center point. This elastic element is used to prevent the center point from striking the end face of the workpiece with the full force of the electric motor and thereby damaging this workpiece.

An especially preferred approach has been found whereby the rod is supported in a bearing provided in the chuck body. If the distance between the rod and the electric motor is very large, a small imbalance in the rotation of the electric motor can cause a large radial component in the rotation at the end of the rod facing the center point. The rod is supported in the rod holder in order to compensate for this radial component and to ensure reliable axial guidance.

It is furthermore advantageous to provide a gear transmission, preferably a planetary transmission between the electric motor and the rod. This allows increased torque to be applied that acts on the rod.

It is also advantageous to provide a threaded tube shaft to actuate the jaws, which hollow rod can be driven by an electrically operated gripping motor. This also enables actuation of the jaws without the use of hydraulic components. Accordingly, with electrical actuation the center point can first axially center a crankshaft workpiece that is subsequently secured radially by the jaws.

It is especially advantageous to provide a harmonic drive between the threaded tube shaft and the rotor of the gripping motor, comprising a nonrotating splined steel sleeve, a driven flex spline, and an inner gear that is coupled to the threaded tube shaft so as to transmit torque. This enables the high rotational speed of the motor to be converted to a lower rotational speed of the threaded sleeve, thereby allowing the jaws to be moved with very high precision.

It has been found advantageous to provide a screw drive on the threaded tube shaft and on the means guided in the chuck body for moving the jaws. This allows the structure extending essentially parallel to the chuck longitudinal axis body to be moved axially in order to move the jaws, so that actuating wedges can be provided on the sides facing the jaws, the actuating wedges pressing the jaws radially inward or outward, It is also advantageous for the rod to pass through the threaded tube shaft without contacting it. This enables the actuator of the jaw to be designed in a very space-saving manner.

An especially advantageous embodiment is characterized in that a spindle rod is provided between the center point and the electric motor, this rod being axially moveable and detachably connected by friction to the center point. This allows the spindle rod to be disconnected as required from the center point. When the chuck is being used, the electric drive does not have to rotate along with the chuck; the setting of the center point is nevertheless maintained.

It has been found advantageous to design the center point as several parts, namely a holder for the spindle rod, at least one elastic spring element, and a tip. Due to the elastic spring element, this configuration also ensures that the center point does not strike the end face of a workpiece to be clamped with the full force of the electric motor.

A spindle drive is advantageously provided between the spindle rod and the rotor of the electric motor, thereby also creating the ability to convert the rotation of the motor to straight-line displacement of the spindle rod.

An especially advantageous approach is to provide a control unit to operate the electric motor. This enables the center point to be rotated about its axis by the electric motor at the same rotational speed as the chuck, with the result that this axis does not move out of the centered position when the chuck is in operation.

It is also advantageous within the scope of the invention to provide a method of operating a chuck having a center point that is axially moveable and guided within the chuck body, an actuator that is detachably connected through an elastic element to the center point, an electric motor including a sensor, and means for converting rotation into straight-line displacement, wherein the means for converting rotation into straight-line displacement by the rotation of the electric motor axially move the actuator while simultaneously driving the center point until a force is applied to the elastic element during a relative motion of the actuator relative to the center point and the work performed thereby is detected by a changing measured value at the sensor.

As a result, the measured value enables a determination to be made as to when the center point has struck the end face of a workpiece to be machined in order to center it. The sensor here is preferably in the form of an ammeter and measures current. The electric motor is always operated at the same rotational speed, although the motor requires a variable amount of electrical current depending on the resistance acting on the rotor. This change in the required current correlates with the force being applied to the elastic element. The greater the current, the more strongly the center point therefore presses against the workpiece.

BRIEF DESCRIPTION OF THE DRAWING

The above and other objects, features, and advantages will become more readily apparent from the following description, reference being made to the accompanying drawing in which.

DETAILED DESCRIPTION OF THE INVENTION

Figure 2:
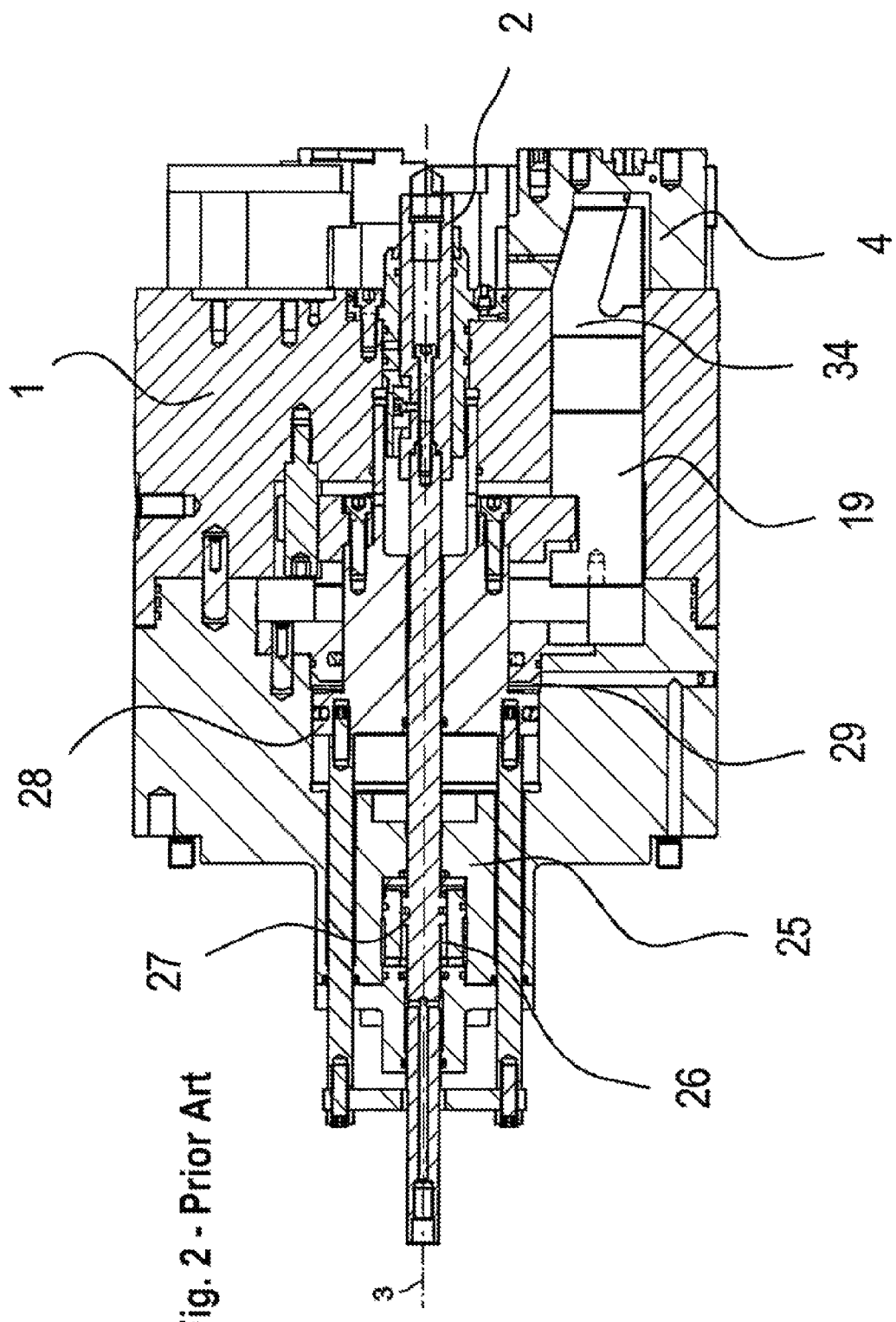
FIG. 2 is a longitudinal section through a chuck as known in the prior art that includes hydraulic components.

As seen in FIG. 2 a prior-art chuck is a jaw chuck for gripping crankshafts, where movement of a center point 2 and jaws 4 is done hydraulically. The center point 2 that is guided here in a chuck body 1 is formed with a ring piston 27 slidable in a piston chamber 26. This piston chamber 26 is closed rearward by a gripping piston 28 that in turn is guided in a chamber 29. It functions to displace jaws 4 radially relative to a chuck longitudinal axis 3, and is powered hydraulically.

When gripping, the center point 2 here is first moved axially until it engages the end face of a workpiece. In order to move the jaws 4, the gripping piston 28 is then actuated hydraulically so as to press the jaws 4 radially against the workpiece, thereby gripping it. In order to release the workpiece, either the gripping piston 28 can be actuated simultaneously with the centering piston 27, or the center point 2 is first moved axially and subsequently the jaws 4 are released.

Figure 1:
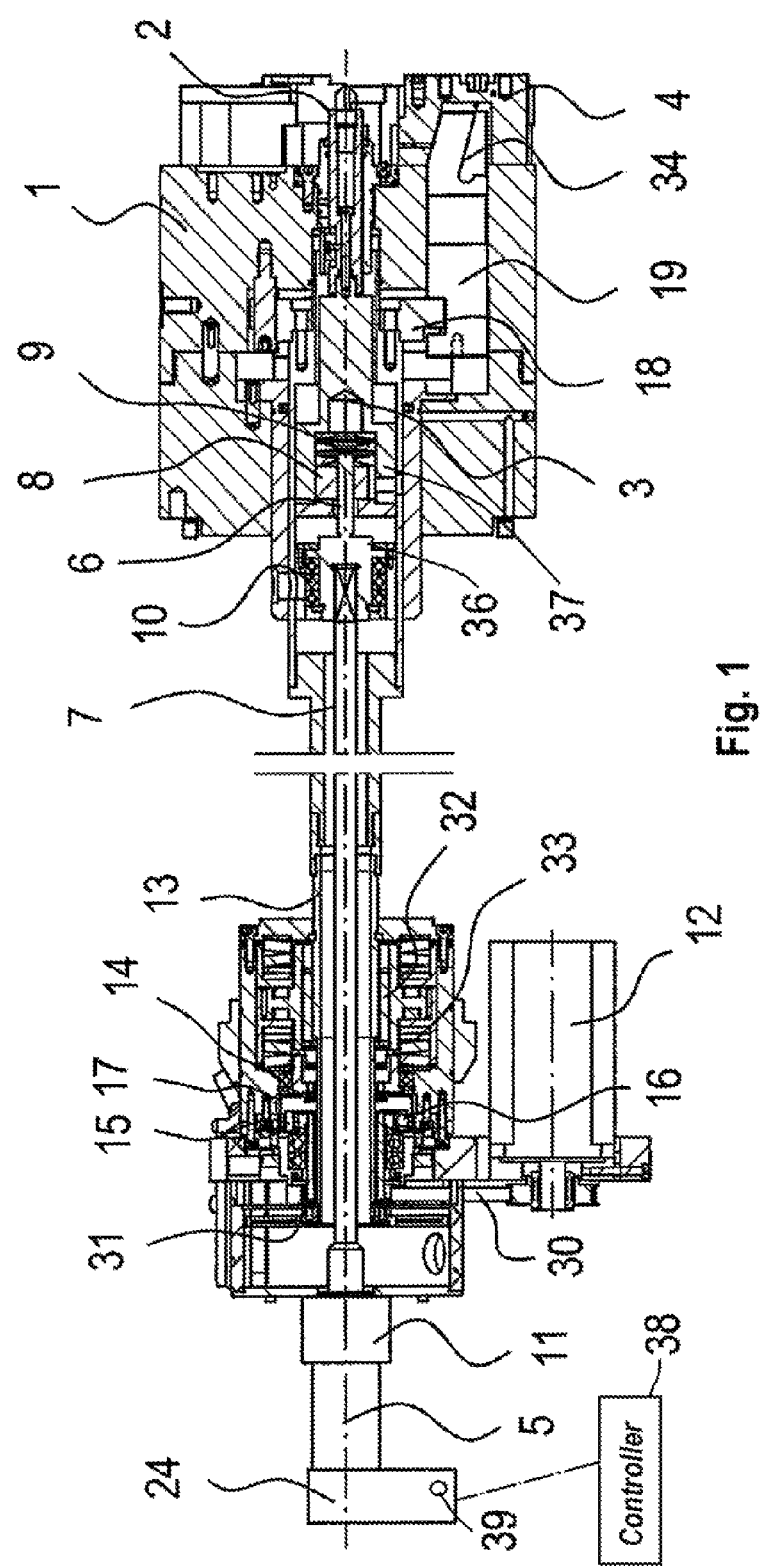
FIG. 1 is a longitudinal section through a first embodiment of the chuck according to the invention.

FIG. 1 shows an embodiment of the chuck according to the invention, also a jaw chuck, that is especially well-suited for crankshafts, comprising the center point 2 that is axially moveable and guided in the chuck body 1, and the jaws 4 moveable radially relative to the chuck longitudinal axis 3. An electric motor 5 is provided to move the center point 2. A spindle drive element 8 is associated with the center point 2 for axially moving the center point 2. An elastic element 9 in the form of a helical spring is provided between the element 8 and the center point 2. It is not absolutely necessary for this to be a helical spring, however. It is also equally possible to use other types of springs, such as, for example, disk springs, volute springs, annular springs, or other spring types.

More particularly, a rod holder 10 also provided in the rotatable chuck body 1 rotatably supports a spindle rod 7 whose axial rear (left in FIG. 1) end is coupled through a stepdown transmission with the motor 5 and whose opposite end is seated in a cylindrical body 36 rotatably supported in the holder 10. A threaded stem 6 projecting axially forward from the body 36 is threaded into nut element 8 that bears via the spring pack 9 on the rear end of another element 37 in turn coupled to the center point 2. Thus as the parts 7, 36, and 6 rotate, they screw the nut 8 axially in or out to shift the center point 2 via the spring pack 9, with the screwthreaded interengaging parts 8 and 6 acting as a transmission converting rotation of the rod 7 to axial movement of the center point 2.

A threaded tube shaft 13 that is drivable by an electrically operated gripping motor 12 is provided to actuate the jaws 4. The rod 7 passes through the threaded tube shaft 13 without touching it.

Figure 4:
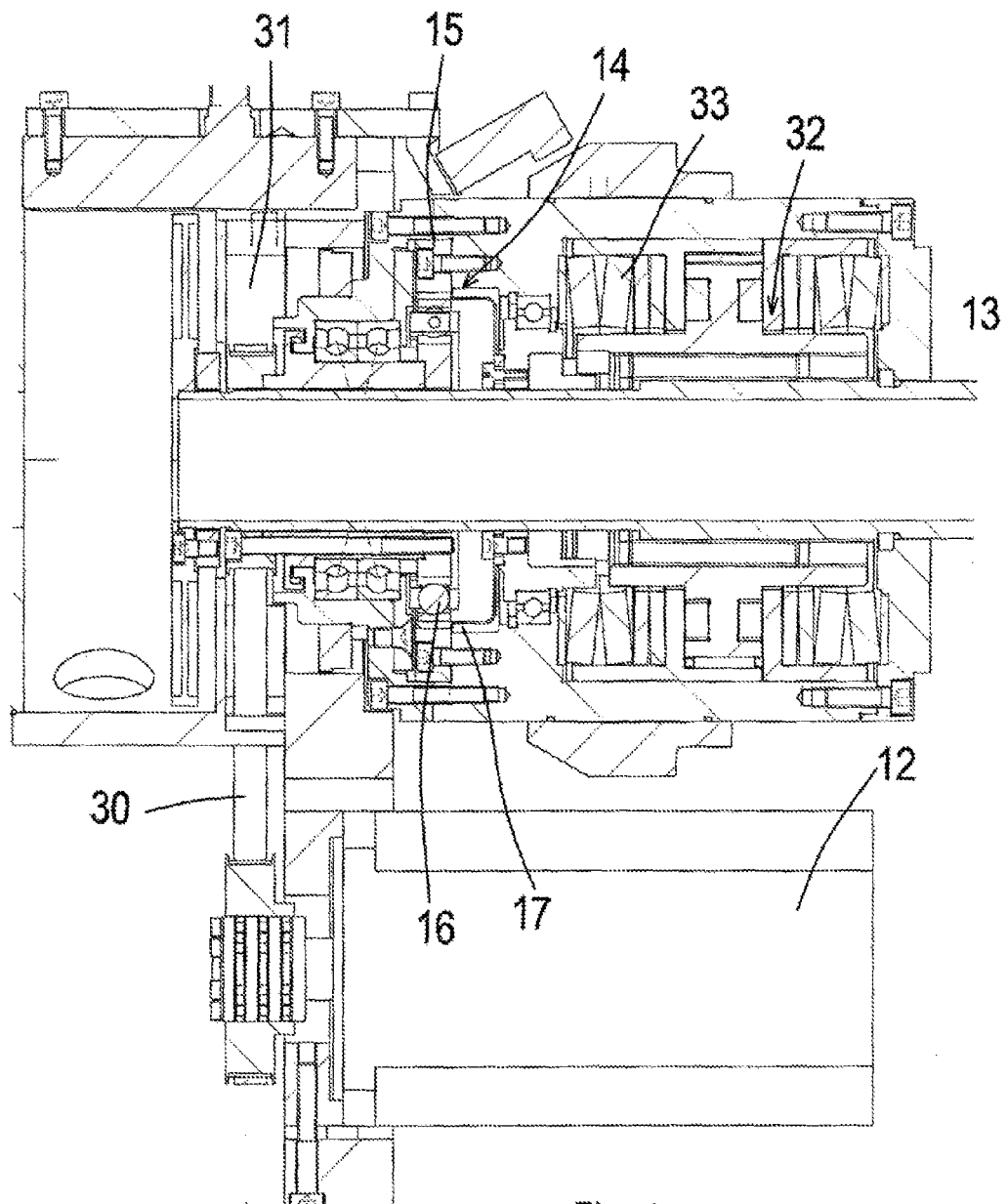
FIG. 4 is a large-scale view of a detail of FIG. 1.

As also shown in FIG. 4, harmonic drive 14 is provided between the threaded tube shaft 13 and the rotor of the gripping motor 12, comprising a non-rotating ring gear 15, a rotatably driven flex spline 16, and a splined steel sleeve 17 that is connected to the threaded tube shaft 13 so as to transmit torque. The rotor in the embodiment shown is connected through a belt drive 30 to a drive wheel 31 that drives the flex spline 16. The splined steel sleeve 17 drives the threaded tube shaft 13 through a planetary roller transmission 32. This planetary transmission 32 in the embodiment is biased by multiple springs 33 that are arranged coaxially relative to chuck longitudinal axis 3, thereby ensuring a reliable drive for the threaded tube shaft 13.

As is evident in the embodiment, the electric centering motor 5 and the gripping motor 12 do not rotate with chuck body 1. To this end the rod 7 passes with considerable clearance through the tube shaft 13.

In order to move the jaws 4, a gripping plate 18 is provided between the threaded tube shaft 13 and the elements 19 guided in chuck body 1 to move the jaws 4. The elements 19 for moving the jaws 4 each have a gripping wedge 34 on the end opposite the gripping plate 18.

A control unit 24 is provided for operating the electric motor 5. During the machining operation, the rotational speeds of the rod 7 and the threaded tube shaft 13 are preferably matched to each other, and this corresponds exactly to the rotational speed of the chuck. What is ensured here is that the jaws 4 and the center point 2 maintain their respective gripping and centering positions when the chuck is operating.

Figure 3:
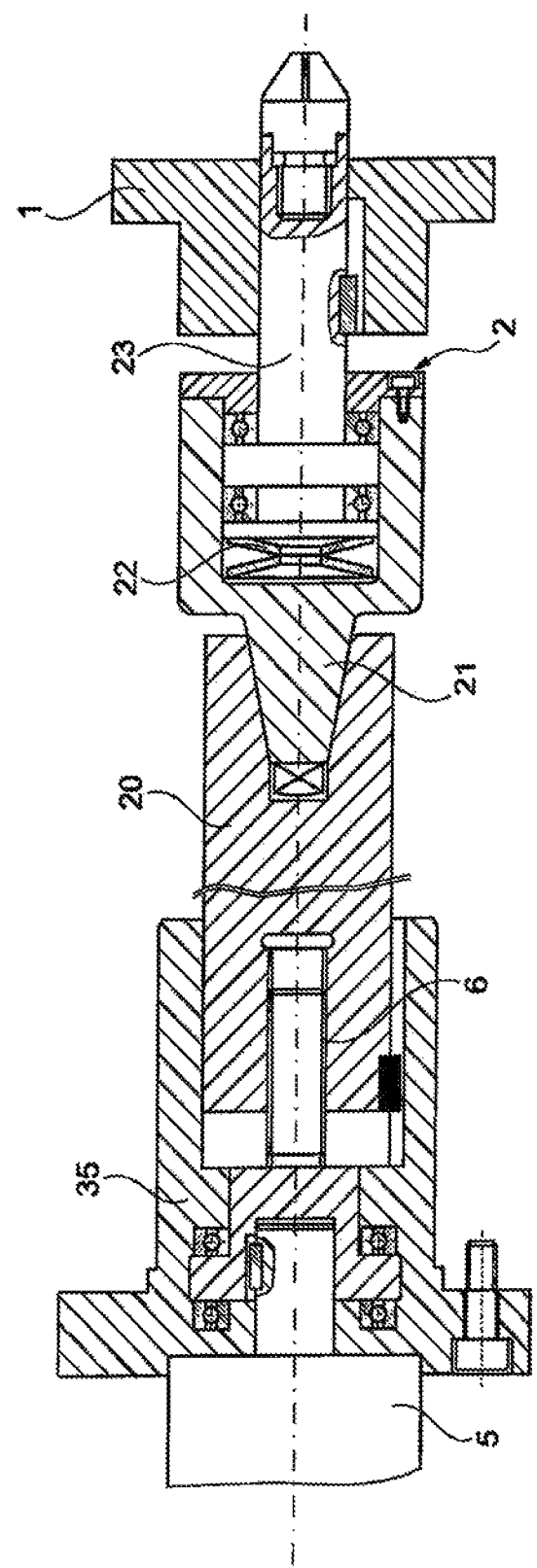
FIG. 3 is a longitudinal section through another embodiment of the invention.

FIG. 3 shows another embodiment of the chuck according to the invention, where here a spindle rod 20 is provided between the center point 2 and the electric motor 5, which spindle rod is axially moveable and is detachably connected by a friction coupling with the center point 2. The center point 2 shown here is of multipart design composed of a holder 21 for the spindle rod, at least one spring element 22, and a tip 23. The spring elements 22 here are disk springs.

The spindle drive 6 is provided between the electric motor 5 and the spindle rod 20 to move the spindle rod 20. In the embodiment shown, the spindle rod 20 is axially movable in a housing 35.

As shown in FIG. 1, a current sensor 39 is provided in the electric motor 24 and is connected to a controller 38 that monitors current consumption of the motor 24. When this current level exceeds a predetermined limit corresponding to a maximum axial pressure to be applied to the center point 2, the controller 38 stops the motor 24.

I claim:

1. A chuck comprising:
   a chuck body rotatable about an axis;
   a plurality of jaws radially displaceable on the body for gripping a workpiece;
   chuck drive means for rotating the chuck about the axis;
   a center point axially shiftable in the body and axially engageable with the workpiece gripped by the jaws;
   an electric drive coupled to the center point for axially shifting same;
   a transmission between the rotary output and the center point for converting rotation of the output to axial displacement of the center point;
   an axially extending rod between the electric drive and the transmission;
   a spindle element between the transmission and the center point, the center point being detachably mounted on the spindle element; and
   an elastic element between the spindle element and the center point.

2. The chuck defined in claim 1, further comprising:
   a holder in the chuck body rotatably supporting the rod.

3. A chuck comprising:
   a chuck body rotatable about an axis;
   a plurality of jaws radially displaceable on the body for gripping a workpiece;
   chuck drive means for rotating the chuck about the axis;
   a center point axially shiftable in the body and axially engageable with the workpiece gripped by the jaws;
   an electric drive coupled to the center point for axially shifting same;
   a transmission between the rotary output and the center point for converting rotation of the output to axial displacement of the center point;
   an axially extending rod between the electric drive and the transmission; and
   a planetary transmission between the rotary output and the rod.

4. A chuck comprising:
   a chuck body rotatable about an axis;
   a plurality of jaws radially displaceable on the body for gripping a workpiece;
   chuck drive means for rotating the chuck about the axis;
   a center point axially shiftable in the body and axially engageable with the workpiece gripped by the jaws;
   an electric drive coupled to the center point for axially shifting same;
   a transmission between the rotary output and the center point for converting rotation of the output to axial displacement of the center point;
   an axially extending rod between the electric drive and the transmission; and
   a threaded tube shaft carrying the chuck body, the chuck drive means being an electrical motor connected to the tube shaft.

5. The chuck defined in claim 4, further comprising:
   a harmonic drive between the motor of the chuck drive means and the tube shaft.

6. The chuck defined in claim 5 wherein the harmonic drive includes
   a nonrotating ring gear,
   a flex spline rotated by the motor of the chuck drive means, and
   a splined steel sleeve coupled to the tube shaft.

7. The chuck defined in claim 5, further comprising:
   a force-transmission plate between the tube shaft and the jaws for radially displacing the jaws.

8. The chuck defined in claim 4, wherein the rod passes axially through the tube shaft without contacting the tube shaft.

9. A chuck comprising:
   a chuck body rotatable about an axis;
   a plurality of jaws radially displaceable on the body for gripping a workpiece;
   chuck drive means for rotating the chuck about the axis;
   a center point axially shiftable in the body and axially engageable with the workpiece gripped by the jaws;
   an electric drive coupled to the center point for axially shifting same;
   an axially shiftable spindle rod between the center point and the electric drive; and
   a friction coupling detachably connecting the center point to the spindle rod.

10. The chuck defined in claim 9, wherein the spindle rod is formed by a holder, at least one spring element, and a tip.

11. The chuck defined in claim 9, further comprising:
    a rotary-to-straight-line spindle-drive transmission between the electric drive and the spindle rod.

* * * * *